(12) United States Patent
Fan et al.

(10) Patent No.: US 11,272,478 B2
(45) Date of Patent: Mar. 8, 2022

(54) COMMUNICATION METHOD AND DEVICE

(71) Applicant: HUAWEI TECHNOLOGIES CO., LTD., Guangdong (CN)

(72) Inventors: Bo Fan, Chengdu (CN); Yalin Liu, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/705,111

(22) Filed: Dec. 5, 2019

(65) Prior Publication Data
US 2020/0112940 A1 Apr. 9, 2020

Related U.S. Application Data

(63) Continuation of application No. PCT/CN2018/090129, filed on Jun. 6, 2018.

(30) Foreign Application Priority Data

Jun. 9, 2017 (CN) .......................... 201710433665.5

(51) Int. Cl.
*H04W 68/00* (2009.01)
*H04W 68/02* (2009.01)
(Continued)

(52) U.S. Cl.
CPC ....... *H04W 68/025* (2013.01); *H04L 61/6054* (2013.01); *H04W 8/26* (2013.01);
(Continued)

(58) Field of Classification Search
CPC . H04W 68/025; H04W 68/005; H04W 76/19; H04W 76/28; H04W 76/11; H04W 76/27; H04W 8/26; H04L 61/6054
See application file for complete search history.

(56) References Cited

U.S. PATENT DOCUMENTS

| 2005/0197125 A1* | 9/2005 | Kang | H04W 52/287 455/439 |
| 2015/0195094 A1* | 7/2015 | Yu | H04W 68/00 370/312 |

(Continued)

FOREIGN PATENT DOCUMENTS

| CN | 102378329 A | 3/2012 |
| CN | 102595338 A | 7/2012 |

(Continued)

OTHER PUBLICATIONS

3GPP TR 23.799 V14.0.0 (Dec. 2016),3rd Generation Partnership Project;Technical Specification Group Services and System Aspects;Study on Architecture for Next Generation System(Release 14),total 522 pages.

(Continued)

*Primary Examiner* — Khai M Nguyen
(74) *Attorney, Agent, or Firm* — Womble Bond Dickinson (US) LLP

(57) ABSTRACT

This application discloses a communication method and a device, and the method includes: sending, by a first base station, a first request message, where the first request message is used to request one or more second base stations located in a paging notification area of a target terminal to page the target terminal; and if the first base station receives, within preset duration, a second request message that is sent by one of the one or more second base stations and that is used to obtain a context of the target terminal, sending, by the first base station, the context of the target terminal to the second base station that sends the second request message. A terminal device in a third mode may be paged by using the method and the device in this application.

20 Claims, 10 Drawing Sheets

(51) Int. Cl.
  *H04W 76/19* (2018.01)
  *H04W 76/28* (2018.01)
  *H04W 76/11* (2018.01)
  *H04W 76/27* (2018.01)
  *H04L 101/654* (2022.01)
  *H04W 8/26* (2009.01)

(52) U.S. Cl.
  CPC .......... *H04W 68/005* (2013.01); *H04W 76/11* (2018.02); *H04W 76/19* (2018.02); *H04W 76/27* (2018.02); *H04W 76/28* (2018.02)

(56) References Cited

U.S. PATENT DOCUMENTS

| | | | |
|---|---|---|---|
| 2015/0245407 A1 | 8/2015 | Johansson et al. | |
| 2019/0349883 A1* | 11/2019 | Fujishiro | H04W 76/11 |
| 2020/0389868 A1* | 12/2020 | Martin | H04W 68/02 |

FOREIGN PATENT DOCUMENTS

| | | |
|---|---|---|
| CN | 103348733 A | 10/2013 |
| CN | 105142218 A | 12/2015 |
| CN | 105307198 A | 2/2016 |
| WO | 2015018045 A1 | 2/2015 |

OTHER PUBLICATIONS

CATT: "Paging for lightly connected UE", 3GPP Draft; R3-162168, vol. RAN WG3, No. Antipolis, France; Oct. 6, 2016 (Oct. 6, 2016), XP051151829, total 4 pages.
NEC: "Solution for RAN paging failure: Use of UE Context Release", 3GPP Draft; R3-170576, vol. RAN WG3, No. Athens, Greece; Feb. 12, 2017 (Feb. 12, 2017), XP051213157, total 4 pages.
3rd Generation Partnership Project; Technical Specification Group Radio Access Network; NR; NR and NG-RAN Overall Description; Stage 2 (Release 15), 3GPP Draft; R2-1705994 38300 v0.3.0, May 19, 2017, XP051285862, total 48 pages.
NEC: "CN Assisted Paging fall-back: How to make it work?", 3GPP Draft; R3-162895, vol. RAN WG3, No. Reno, Nevada, USA; Nov. 14, 2016 (Nov. 14, 2016), XP051178994, total 4 pages.
3GPP TS 36.300, V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Mar. 23, 2017, pp. 1-334, XP051291440.
Huawei et al: "Revisit on NAS protocol impacts of Light Connection", 3GPP Draft; C1-170766, vol. CT WG1, No. Dubrovnik (Croatia); Feb. 12, 2017, XP051206622, total 10 pages.
Samsung: "UE energy consumption and CN signaling overhead with fast transition to RRC inactive state", 3GPP Draft; R2-1701526, vol. RAN WG2, No. Athens, Greece; Feb. 12, 2017, XP051212152, total 8 pages.

* cited by examiner

First request message

| Terminal identifier field | Paging range area field | IMSI field | DRX cycle field |
|---|---|---|---|

Paging failure indication message

COMMUNICATION METHOD AND DEVICE

CROSS-REFERENCE TO RELATED APPLICATIONS

This application is a continuation of International Application No. PCT/CN2018/090129, filed on Jun. 6, 2018, which claims priority to Chinese Patent Application No. 201710433665.5, filed on Jun. 9, 2017. The disclosures of the aforementioned applications are herein incorporated by reference in their entireties.

TECHNICAL FIELD

This application relates to the field of wireless communications technologies, and in particular, to a communication method and a device.

BACKGROUND

In a long term evolution (LTE) system, a terminal device has two radio resource control (RRC) modes, which are an RRC_CONNECTED mode and an RRC_IDLE mode. As shown in FIG. 1, in the RRC_CONNECTED mode, both an RRC connection and an S1AP connection exist. In the RRC_IDLE mode, both the RRC connection and the S1AP connection are interrupted. The RRC connection is a connection between a terminal and a base station, and the S1AP connection is a connection between a base station and a core network.

Currently, in a 5G communications system, a new RRC mode, which is referred to as a third mode below, is introduced. Still referring to FIG. 1, in the third mode, the S1AP connection exists, but the RRC connection does not exist. In the third mode, the terminal cannot receive data from the core network. However, because the S1AP connection exists, the core network cannot distinguish whether the terminal is in the RRC_CONNECTED mode or the third mode. In this case, the core network determines that the terminal is in the RRC_CONNECTED mode by default. As shown in FIG. 3, when a core network needs to send data to a target terminal, the core network sends the data to a base station (referred to as an anchor base station below) corresponding to the target terminal. However, after the anchor base station receives the data from the core network, there is currently no relatively good solution to how to page the target terminal.

SUMMARY

This application provides a communication method and a device, to page a terminal device in a third mode.

According to a first aspect, a communication method is provided. The method includes: sending, by a first base station, a first request message, where the first request message is used to request one or more second base stations located in a paging notification area of a target terminal to page the target terminal; and if the first base station receives, within preset duration, a second request message that is sent by one of the one or more second base stations and that is used to obtain a context of the target terminal, sending, by the first base station, the context of the target terminal to the second base station that sends the second request message.

According to the foregoing method, the first base station triggers paging the target terminal. Because a paging area in which a base station triggers paging is smaller than a paging area in which a core network triggers paging, power consumption of paging can be reduced by using the method in this application.

In one embodiment, the preset duration is preset duration timed by a timer, and the sending, by a first base station, a first request message includes: starting, by the first base station, the timer; and sending, by the first base station, the first request message; and that the first base station receives, within preset duration, a second request message that is sent by one of the one or more second base stations includes: receiving, by the first base station within the preset duration timed by the timer, the second request message that is sent by one of the one or more second base stations.

In one embodiment, the method provided in the first aspect further includes: if the first base station does not receive, within the preset duration, the second request message that is sent by one of the one or more second base stations, determining whether a quantity of times of sending the first request message by the first base station reaches a preset value; and sending a paging failure indication message to a core network device if the quantity of times of sending the first request message by the first base station reaches the preset value.

According to the foregoing method, if the first base station does not receive, within the preset duration for sending the first request message, the second request message in response to the first request message, the first base station sends the paging failure indication message to the core network device, to trigger the core network to page the terminal device. Therefore, a long waiting time after the first base station sends the first request message may be avoided and a communication delay is reduced by using the method in this application.

In one embodiment, the method provided in the first aspect further includes: adding 1 to the quantity of times of sending the first request message if the quantity of times of sending the first request message by the first base station does not reach the preset value, and performing the operations of "sending a first request message, and if a second request message sent by one of the one or more second base stations is received within preset duration, sending a context of the target terminal to the second base station that sends the second request; or if the second request message that is sent by one of the one or more second base stations is not received within the preset duration, determining whether a quantity of times of sending the first request by the first base station reaches a preset value" again.

In one embodiment, the method provided in the first aspect further includes: sending a paging failure indication message to a core network device if the first base station does not receive, within the preset duration, the second request message that is sent by one of the one or more second base stations.

According to the foregoing method, if the first base station does not receive, within the preset duration for sending the first request message, the second request message in response to the first request message, the first base station sends the paging failure indication message to the core network device, and the core network triggers paging the terminal device. Therefore, a success rate of paging to the target terminal may be ensured.

In one embodiment, the first base station sends the first request message through an Xn or X2 port, and the first base station receives the second request message through the Xn or X2 port.

In one embodiment, the first base station sends the paging failure indication message through an NG port or an S1 port.

In one embodiment, the paging failure indication message includes a message type field and a terminal identifier field, the message type field is used to indicate a type of the paging failure indication message, and the terminal identifier field is used to indicate an identifier of the paged target terminal.

In one embodiment, the first request message includes at least the terminal identifier field and a paging range area field, the paging range area field is used to indicate a range area of the second base station that pages the target terminal, and the terminal identifier field is used to indicate the identifier of the paged target terminal.

In one embodiment, the first request message includes an international mobile subscriber identity IMSI field, and the IMSI field is used to indicate at least one bit of an IMSI of the paged target terminal.

In one embodiment, the first request message includes a discontinuous reception DRX cycle field, and the DRX cycle field is used to indicate a DRX cycle of the target terminal.

In this application, the IMSI field and the DRX cycle field are used by the second base station to calculate a wake-up time of the terminal device, and the second base station sends the paging message at the wake-up time of the terminal device. In this way, the second base station may be prevented from aimlessly sending the paging message, thereby reducing power consumption of the second base station.

According to a second aspect, a communication method is provided. The method includes: receiving, by a second base station, a first request message sent by a first base station, where the first request message is used to request the second base station located in a paging notification area of a target terminal to page the target terminal; sending, by the second base station, a paging message, where the paging message is used to page the target terminal; sending, by the second base station, a second request message to the first base station when receiving a response message sent by the target terminal, where the second request message is used to obtain a context of the target terminal; and receiving, by the second base station, the context of the target terminal sent by the first base station.

In one embodiment, the response message is an RRC connection setup acknowledgment message or an RRC connection resume acknowledgment message.

In one embodiment, the second base station receives the first request message through an Xn or X2 port, and the second base station sends the second request message through the Xn or X2 port.

In one embodiment, the first request message includes at least a terminal identifier field and a paging range area field, the paging range area field is used to indicate a range area of the second base station that pages the target terminal, and the terminal identifier field is used to indicate an identifier of the paged target terminal.

In one embodiment, the first request message includes an international mobile subscriber identity IMSI field, and the IMSI field is used to indicate at least one bit of an IMSI of the paged target terminal.

In one embodiment, the first request message includes a discontinuous reception DRX cycle field, and the DRX cycle field is used to indicate a DRX cycle of the target terminal.

In one embodiment, the sending, by the second base station, a paging message includes: calculating, by the second base station, a wake-up time of the target terminal based on the IMSI field and the DRX cycle field that are in the first request message; and sending, by the second base station, the paging message at the wake-up time of the target terminal.

In one embodiment, the paging message includes a first identifier of the paged target terminal or a second identifier of the paged target terminal, the first identifier is a temporary mobile subscriber identity S-TMSI or the international mobile subscriber identity IMSI of the paged target terminal, and the second identifier is another identifier, other than the S-TMSI or the IMSI, of the paged target terminal.

According to a third aspect, a paging method is provided. The method includes: receiving, by a core network device, a paging failure indication message sent by a first base station, where the paging failure indication message is used to indicate that a process in which the first base station pages a target terminal fails; and triggering, by the core network device, paging to the target terminal based on the paging failure indication message.

In one embodiment, the paging failure indication message is used to include a message type field and a terminal identifier field, the message type field is used to indicate a type of the paging failure indication message, and the terminal identifier field is used to indicate an identifier of the paged target terminal.

In one embodiment, the core network device receives the paging failure indication message through an NG port or an S1 port.

According to a fourth aspect, a paging method is provided. The method includes: receiving, by a terminal device, a paging message sent by one or more second base stations, where the paging message is sent by the one or more second base stations when the one or more second base stations receive a first request message sent by a first base station, and the first request message is used to request the one or more second base stations located in a paging notification area of the terminal device to page the target terminal; and sending, by the terminal device, a response message to one of the one or more second base stations, where the response message is used by the terminal device to set up a radio resource control RRC connection to the second base station.

In one embodiment, the sending, by the terminal device, a response message to one of the one or more second base stations includes: receiving, by the terminal device, paging messages sent by a plurality of second base stations; selecting, by the terminal device from the plurality of second base stations, a second base station whose cell quality meets a requirement; and sending, by the terminal device, the response message to the second base station whose cell quality meets the requirement, where the response message is used by the terminal device to set up an RRC connection to the second base station whose cell quality meets the requirement.

In one embodiment, the sending, by the terminal device, the response message to the second base station whose cell quality meets the requirement includes: sending, by the terminal device when determining that the paging message includes a first identifier of the terminal device, an RRC connection setup acknowledgment message to the second base station whose cell quality meets a condition.

In one embodiment, the sending, by the terminal device, the response message to the second base station whose cell quality meets the requirement includes: sending, by the terminal device when determining that the paging message includes a second identifier of the terminal device, an RRC connection resume acknowledgment message to the second base station whose cell quality meets the requirement.

In one embodiment, the sending, by the terminal device, a response message to one of the one or more second base stations includes: receiving, by the terminal device, a paging message sent by a second base station; and sending, by the terminal device, a response message to the second base station, where the response message is used by the terminal device to set up an RRC connection to the second base station.

In one embodiment, the sending, by the terminal device, a response message to the second base station includes: sending, by the terminal device, an RRC connection setup acknowledgment message to the second base station when determining that the paging message sent by the second base station includes a first identifier of the terminal device.

In one embodiment, the sending, by the terminal device, a response message to the second base station includes: sending, by the terminal device, an RRC connection resume acknowledgment message to the second base station when determining that the paging message sent by the second base station includes a second identifier of the terminal device.

In one embodiment, the first identifier is a temporary mobile subscriber identity S-TMSI or an international mobile subscriber identity IMSI of the terminal device.

In one embodiment, the second identifier is another identifier, other than a temporary mobile subscriber identity S-TMSI and an international mobile subscriber identity IMSI, of the terminal device.

In one embodiment, the first request message includes at least a terminal identifier field and a paging range area field, the paging range area field is used to indicate a range area of the second base station that pages the target terminal, and the terminal identifier field is used to indicate an identifier of the paged target terminal.

In one embodiment, the first request message includes an international mobile subscriber identity IMSI field, and the IMSI field is used to indicate at least one bit of an IMSI of the paged target terminal.

In one embodiment, the first request message includes a discontinuous reception DRX cycle field, and the DRX cycle field is used to indicate a DRX cycle of the target terminal.

According to a fifth aspect, this application further provides a first base station, and the first base station has a function of implementing behavior of the first base station in the method example in the first aspect. The functions may be implemented by hardware, or may be implemented by hardware executing corresponding software. The hardware or the software includes one or more modules corresponding to the function.

In one embodiment, a structure of the first base station includes a processor and a transceiver. The processor and the transceiver may perform corresponding functions in the method example in the first aspect. For details, refer to detailed descriptions in the method example in the first aspect. Details are not described herein again.

According to a sixth aspect, this application further provides a second base station, and the second base station has a function of implementing behavior of the second base station in the method example in the second aspect. The function may be implemented by hardware, or may be implemented by hardware executing corresponding software. The hardware or the software includes one or more modules corresponding to the function.

In one embodiment, a structure of the second base station includes a processor and a transceiver. The processor and the transceiver may perform corresponding functions in the method example in the second aspect. For details, refer to detailed descriptions in the method example in the second aspect. Details are not described herein again.

According to a seventh aspect, this application further provides a core network device, and the core network device has a function of implementing behavior of the core network device in the method example in the third aspect. The function may be implemented by hardware, or may be implemented by hardware executing corresponding software. The hardware or the software includes one or more modules corresponding to the function.

In one embodiment, a structure of the core network device includes a processor and a transceiver. The processor and the transceiver may perform corresponding functions in the method example in the third aspect. For details, refer to detailed descriptions in the method example in the third aspect. Details are not described herein again.

According to an eighth aspect, this application further provides a terminal device. The terminal device has a function of implementing behavior of the terminal device in the method example of the fourth aspect. The function may be implemented by hardware. A structure of the terminal device includes a communications module, a processor, a bus, a display panel, and a memory. The processor, the display panel, and the memory are connected by using the bus. The display panel is configured to display an image. The processor invokes an instruction stored in the memory to perform the foregoing method. The communications module is configured to receive a paging message and send the paging message.

In one embodiment, the communications module may be an RF circuit, a Wi-Fi module, a communications interface, a Bluetooth module, or the like.

According to a ninth aspect, this application further provides a terminal device. The terminal device has a function of implementing behavior of the terminal device in the fourth method example. The function may be implemented by hardware, or may be implemented by hardware executing corresponding software. The hardware or the software includes one or more modules corresponding to the function.

In one embodiment, a structure of the terminal device includes a processor and a transceiver. The processor and the transceiver may perform corresponding functions in the method example in the fourth aspect. For details, refer to detailed descriptions in the fourth method example. Details are not described herein again.

According to a tenth aspect, a computer readable storage medium is provided. The storage medium stores a computer instruction, and when the computer instruction is executed by a computer, the computer is enabled to perform the method according to any one of the first aspect to the fourth aspect.

According to an eleventh aspect, a computer program product is provided. The computer program product includes a computer instruction, and when the computer instruction is executed by a computer, the computer is enabled to perform the method according to any one of the first aspect to the fourth aspect. According to a twelfth aspect, a communications apparatus is provided. The communications apparatus includes a processing element (or a chip) configured to perform the method according to any one of the first aspect to the fourth aspect.

According to a thirteenth aspect, a communications system is provided. The communications system includes one or more of a first base station, a second base station, a core network device, and a terminal device.

It can be learned from the foregoing that, in this application, the first base station may send the first request to request the one or more second base stations located in the paging notification area of the target terminal to page the target terminal. The second base station sends the second request to the first base station after successfully paging the target terminal. If the first base station receives the second request message from the second base station within the preset duration, the first base station sends the context of the target terminal to the second base station. In this case, the second base station may set up the RRC connection to the target terminal, and the second terminal is successfully paged. For a terminal device in a third mode, an RRC connection between the terminal device and a base station does not exist. Therefore, according to the method in this application, after receiving data sent by a core network to the terminal device, the first base station may page the terminal device.

DESCRIPTION OF EMBODIMENTS

For ease of understanding, a description of concepts related to this application is provided for reference by using an example, shown as follows:

A base station (BS) device, which may also be referred to as a base station, is an apparatus that is deployed in a radio access network to provide a wireless communication function. For example, in a 2G network, a device providing a base station function includes a base transceiver station (base transceiver station, BTS) and a base station controller (base station controller, BSC). In a 3G network, a device providing a base station function includes a NodeB ( ) and a radio network controller (RNC). In a 4G network, a device providing a base station function includes an evolved NodeB (eNB). In WLAN, a device providing a base station function is an access point (access point, AP). In a future 5G network such as a new radio (New Radio, NR) or LTE+, a device providing a base station function includes a next generation NodeB (gNB), a TRP (transmission and reception point), or a TP (transmission point). The TRP or the TP may not include a baseband part and includes only a radio frequency part, or may include both a baseband part and a radio frequency part.

User equipment (UE) is a terminal device, and may be a mobile terminal device, or may be an immobile terminal device. The device is mainly configured to receive or send service data. User equipments may be distributed in a network. The user equipments in different networks have different names, such as a terminal, a mobile console, a subscriber unit, a station, a cellular phone, a personal digital assistant, a wireless modem, a wireless communications device, a handheld device, a laptop computer, a cordless telephone set, a wireless local loop station, and a vehicle-mounted device. The user equipment may communicate with one or more core networks by using a radio access network (RAN) (an accessed part of a wireless communications network), for example, exchanges voice and/or data with the radio access network.

A core network device is connected to a plurality of access networks, and includes a circuit switched (CS) domain and a data switched ( ) domain. A CS network element has a mobile switching center, a visited location register, and a gateway mobile switching center. A PS network element has a serving GPRS serving node and a gateway GPRS support node. Authentication centers of some network elements, such as a home location register and the visited location register, can be shared by the CS domain and the PS domain.

Figure 1:
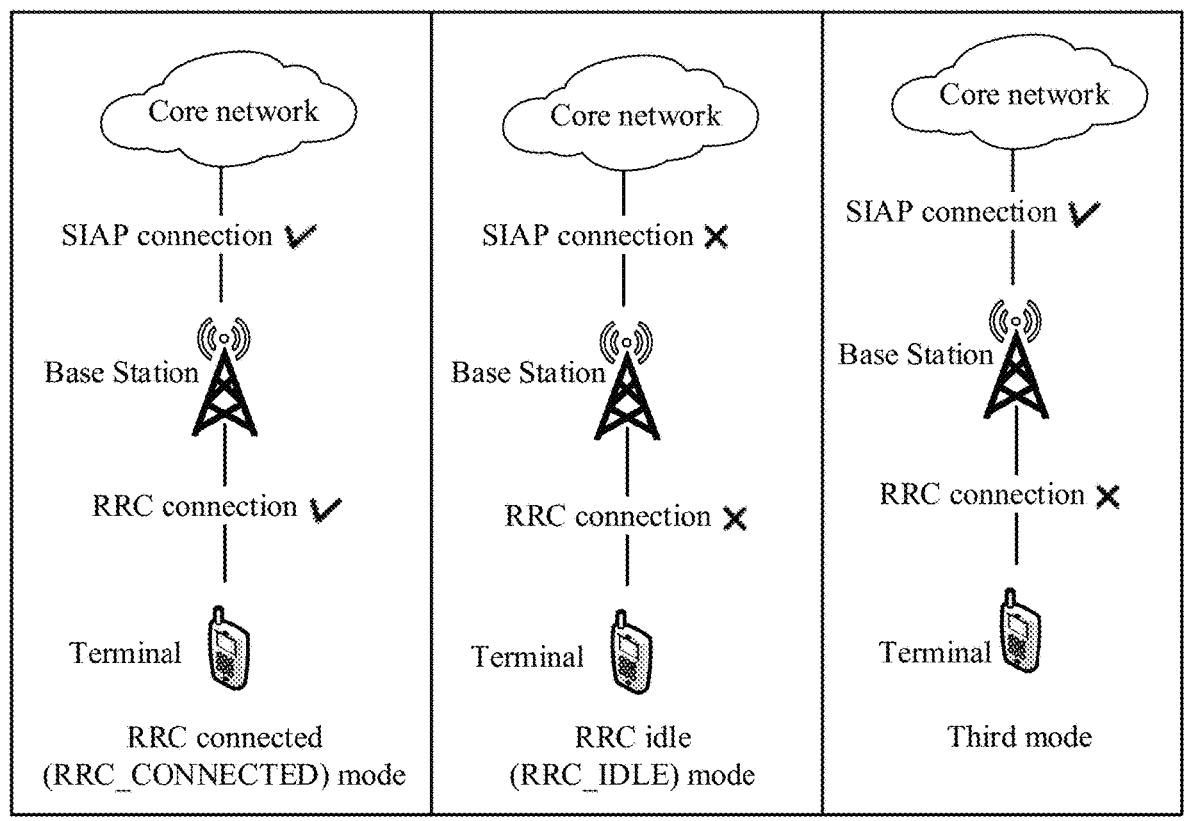
FIG. 1 shows three modes of a terminal device according to this application.

A third mode is referred to as an RRC INACTIVE mode in discussion of the 3GPP standard. As shown in FIG. 1, in the third mode, an application protocol (S1AP) connection of a terminal device exists, and a radio resource control (RRC) connection does not exist. The S1AP connection is a connection between a core network and a base station, and the RRC connection is a connection between a terminal and the base station.

The following describes technical solutions in this application with reference to the accompanying drawings.

Still referring to FIG. 1, when the terminal device is in the third mode, because the S1AP connection of the terminal device exists, a base station that manages the terminal may receive data from a core network. However, because the RRC connection of the terminal device is interrupted, the terminal device cannot receive data from a corresponding base station. This application may be applied to a process in which the base station pages the terminal device in the third mode after receiving data sent by the core network.

Figure 2:
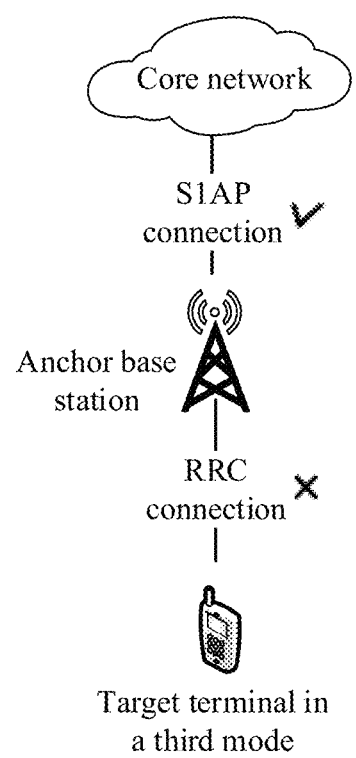
FIG. 2 is a schematic diagram of a target terminal in a third mode according to this application.

In this application, for ease of differentiation, a to-be-paged terminal device may be referred to as a target terminal, and a base station that manages the target terminal is referred to as an anchor base station. In this application, as shown in FIG. 2, a target terminal is in a third mode, an RRC connection between the target terminal and an anchor base station is interrupted, and an S1AP connection between the anchor base station and a core network exists.

Figure 3:
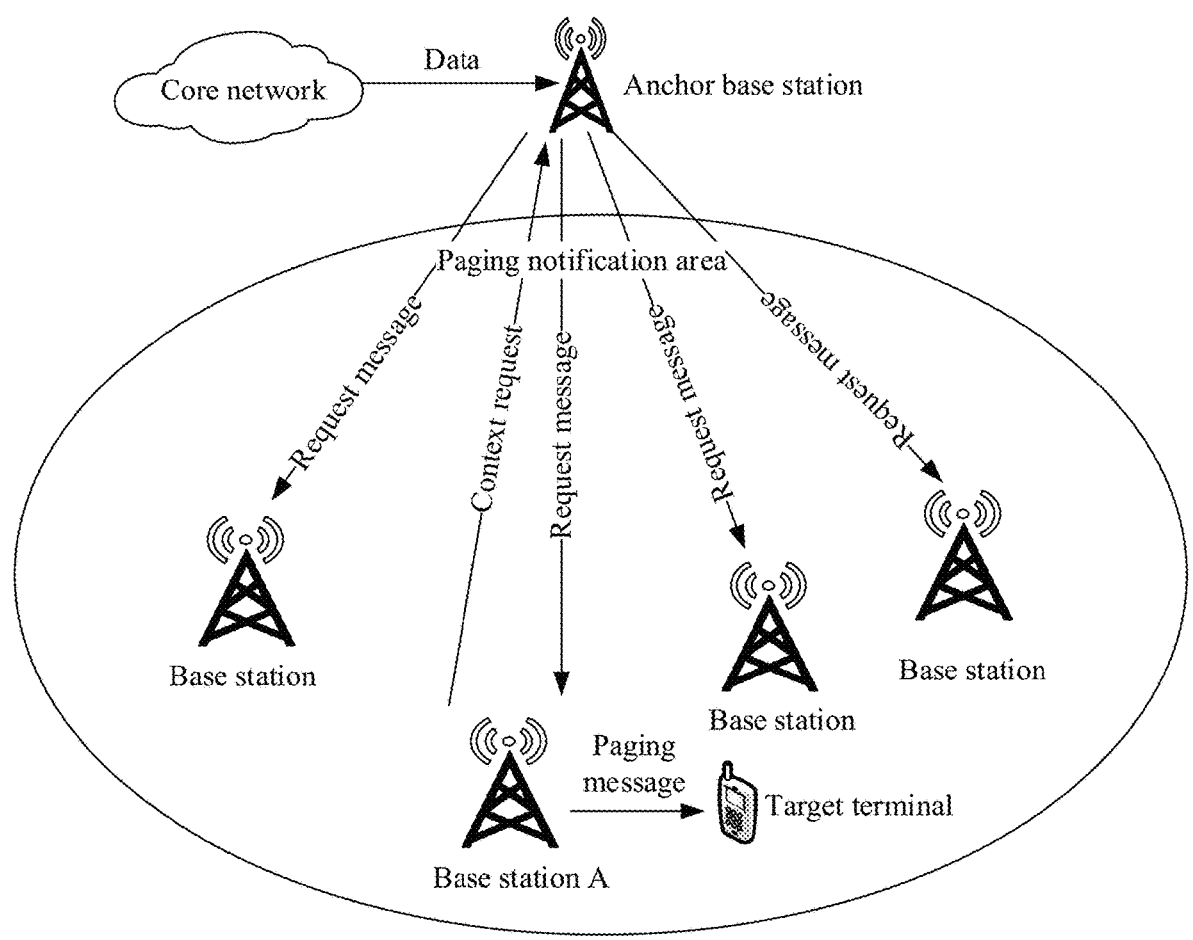
FIG. 3 shows a process in which an anchor base station pages a target terminal according to this application.
Figure 4:
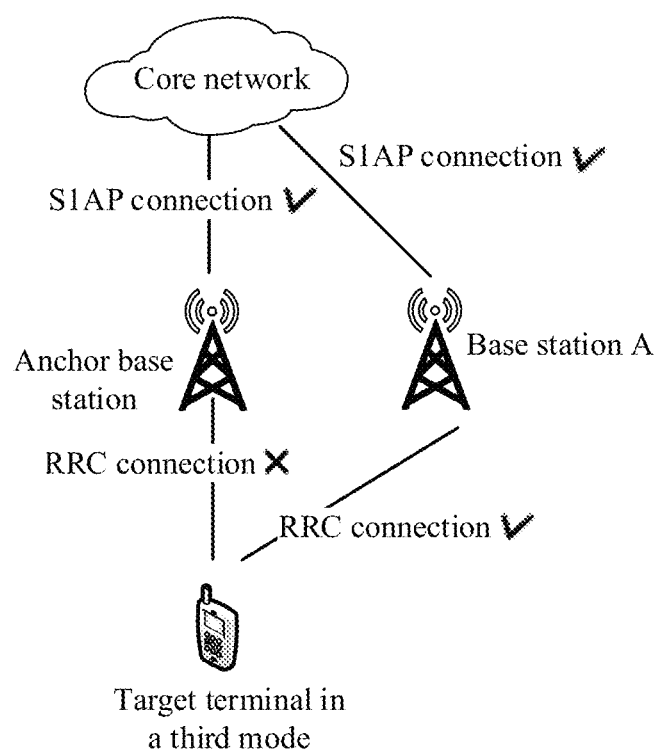
FIG. 4 is another schematic diagram of a target terminal in a third mode according to this application.

FIG. 3 is a schematic diagram of a system network according to this application. As shown in FIG. 3, when a core network needs to send data to a target terminal, the core network first finds a base station that manages the target terminal, that is, an anchor base station, and then sends the data to the anchor base station. When receiving the data and determining that the target terminal is in an RRC interrupted mode, the anchor base station initiates a process of paging the target terminal. A paging principle is as follows: First, the anchor base station determines a paging notification area of the target terminal, and then sends a first request message to base stations in the paging notification area of the target terminal. When receiving the first request message, the base stations located in the paging notification area send paging messages in cells respectively managed by the base stations to page the target terminal. Still referring to FIG. 3, if a base station (for ease of differentiation, the base station may be referred to as a base station A) in the paging notification area pages the target terminal, the base station sends a context request to the anchor base station. After the base station A obtains a context of the target terminal from the anchor base station, as shown in FIG. 4, the base station A may set up an RRC connection to the target terminal. In this case, the anchor base station may forward, to the base station A, the data sent by the core network to the target terminal, and then the base station A sends the data to the target terminal. It is determined whether the anchor base station can receive the context request of the target terminal within preset duration. If the anchor base station can receive the context request of the target terminal, it is determined that a paging process of the anchor base station is successful; otherwise, it is determined that the paging process of the anchor base station fails, and the anchor base station requests the core network to page the target terminal again.

It should be noted that a plurality of mentioned in this application means two or more. Terms such as "first" and "second" described in this application are used for differentiation only, and are not used to indicate or imply relative importance or a sequence.

It should be further noted that some scenarios in embodiments of this application are described by using a 4G network scenario in a wireless communications network as an example. It should be noted that, solutions of the embodiments of this application may also be applied to another wireless communications network, and a corresponding name may be replaced with a corresponding function name in the another wireless communications network.

Figures 5, 6:
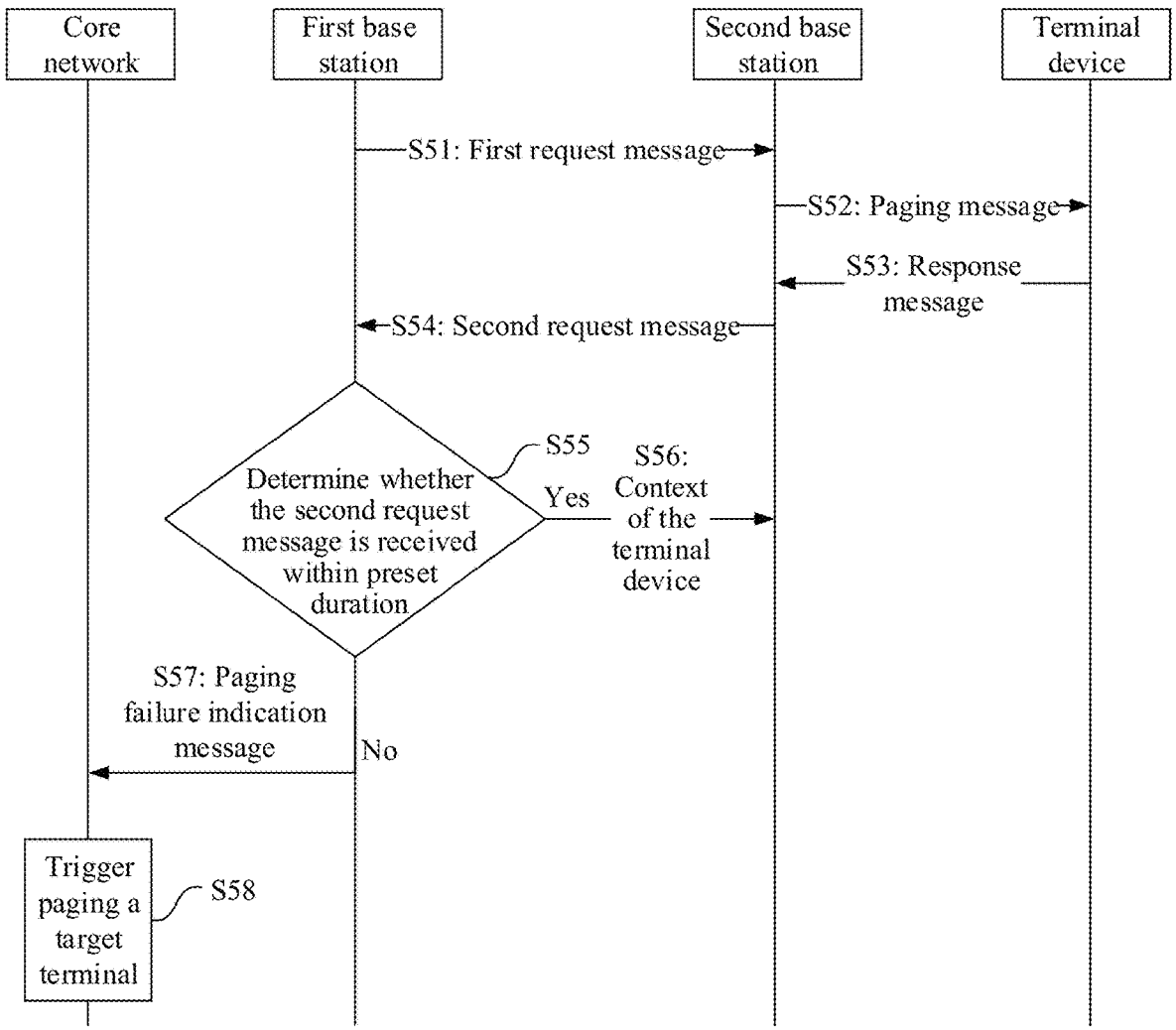
FIG. 5 is a schematic diagram of a communication method according to this application.
FIG. 6 is a schematic diagram of a first request message according to this application.

FIG. 5 shows a process of a paging method according to this application. A first base station in the process may correspond to the anchor base station in FIG. 2, FIG. 3, and FIG. 4, a second base station may correspond to the base station located in the paging notification area of the target terminal in FIG. 3, and a terminal device may correspond to the target terminal in FIG. 2, FIG. 3, and FIG. 4. As shown in FIG. 5, the paging method includes the following operations.

In operation S51, a first base station sends a first request message, and the first request message is used to request one or more second base stations located in a paging notification area of a target terminal to page the target terminal.

In this application, specifically, when sending the first request message, the first base station may start a timer. The timer is configured to record duration for sending the first request message.

In this application, as shown in FIG. 6, the first request message includes at least a terminal identifier field and a paging range area field. The paging range area field is used to indicate a range area of the second base station that pages the target terminal, and the terminal identifier field is used to indicate an identifier of the paged target terminal.

In this application, content of the terminal identifier field in the first request message may be specifically a temporary mobile subscriber identity (TMSI), e.g., a Serving-Temporary Mobile Subscriber Identity (S-TMSI), an international mobile subscriber identity (IMSI), or another identifier of the paged target terminal.

In this application, still referring to FIG. 6, the first request message may further include an IMSI field and a discontinuous reception (Discontinuous Reception, DRX) cycle field. The IMSI field is used to indicate at least one bit of an IMSI of the paged target terminal, the DRX cycle field is used to indicate a DRX cycle of the target terminal, and the DRX cycle field and the IMSI field are used by the second base station to determine a time for paging the target terminal. The time for paging the target terminal is a time for sending a paging message that includes the identifier of the target terminal.

In this application, content in the IMSI field in the first request message may be specifically last N bits of the IMSI of the paged target terminal, where N is a positive integer. For example, N may be 10.

In this application, content of the DRX cycle field in the first request message may be specifically a terminal-specific DRX cycle or a cell-specific DRX cycle. The terminal-specific DRX cycle is a DRX cycle specified by a terminal, and the cell-specific DRX cycle is a DRX cycle specified by a cell.

In this application, the first base station may specifically send the first request through an X2 port in an LTE system or an Xn port in 5G. The X2 port may be specifically a port for mutual communication between base stations in the LTE system, and the Xn port may be specifically a port for mutual communication between base stations in a 5G system.

Step S52: The second base station sends a paging message, and the paging message is used to page the target terminal.

In this application, the second base station may first obtain the identifier of the paged target terminal from the first request message, and generate the paging message. The paging message includes at least the identifier of the paged target terminal. In this application, the paging message may specifically carry a first identifier or a second identifier of the paged target terminal. The first identifier may be specifically the S-TMSI or the IMSI of the target terminal, and the second identifier may be specifically another identifier, other than the S-TMSI or the IMSI, of the target terminal. Subsequently, the second base station may calculate a wake-up time of the target terminal based on the DRX cycle field and the IMSI field, and send the paging message within the wake-up time of the target terminal.

Step S53: A terminal device sends a response message to one of the one or more second base stations.

In this application, when receiving the paging message from the second base station, the terminal device first determines whether the paging message includes an identifier of the current terminal device. If the paging message includes the identifier of the current terminal device, it indicates that the paging message is related to the current terminal device, that is, the paging message is for paging the current terminal device, and a response message is sent to the second base station; otherwise, it indicates that the paging message is not related to the current terminal device, that is, the paging message is not for paging the current terminal device, and the processing ends. In this application, the response message may be an RRC connection setup acknowledgment message or an RRC connection resume acknowledgment message (RRC Connection Resume Complete).

In this application, specifically, when the paging message includes a first identifier of the terminal device, the terminal device may send the RRC connection setup acknowledgment message to the second base station, and when the paging message includes a second identifier of the terminal device, the terminal device sends the RRC connection resume acknowledgment message to the second base station.

In this application, for a case in which the terminal device simultaneously receives paging messages sent by a plurality of second base stations, if the paging messages of the plurality of second base stations all include the identifier of the terminal device, the terminal device selects, from the plurality of second base stations, a second base station whose cell quality meets a requirement (for example, selecting a second base station having best cell quality). The terminal device randomly accesses the second base station whose cell quality meets the requirement, and sends, after a random access process is completed, an RRC acknowledgment message to the second base station whose cell quality meets the requirement. When the paging messages of the plurality of second base stations carry the first identifier of the terminal device, the sent RRC acknowledgment message may be specifically the RRC connection setup acknowledgment message, and when the paging messages of the plurality of second base stations carry the second identifier of the terminal device, the sent RRC acknowledgment message may be specifically the RRC connection resume acknowledgment message.

In this application, for a case in which the terminal device receives a paging message sent by only one second base station, if the paging message includes the identifier of the terminal device, the terminal device randomly accesses the second base station, and sends, after a random access process is completed, an RRC acknowledgment message to the second base station. In this application, if the paging message includes the first identifier of the terminal device, the RRC connection setup acknowledgment message is sent to the second base station, and if the paging message includes the second identifier of the terminal device, the RRC connection resume acknowledgment message is sent to the second base station.

Step S54: The second base station sends a second request message to the first base station, where the second request message is used to obtain a context of the terminal device.

In this application, the second request message may be a terminal device context obtaining message, for example, a UE context fetch message.

In this application, the second base station may specifically send the second request message through the Xn or X2 port.

Step S55: The first base station determines whether the first base station receives, within preset duration, the second request message that is sent by one of the one or more second base stations, and if the first base station receives the second request message, performs step S56; otherwise, performs step S57.

In this application, the first base station may specifically determine whether the first base station can receive, within the preset duration of the timer, the second request message sent by one or more second base stations, and if the first base station can receive the second request message, it may be determined that the first base station successfully pages the target terminal; otherwise, it may be determined that the first base station fails to page the target terminal, and a core network device is triggered to page the target terminal.

Step S56: The first base station sends the context of the terminal device to the second base station.

In this application, after obtaining the context of the terminal device, the second base station may set up an RRC connection between the second base station and the terminal device.

Step S57: The first base station sends a paging failure indication message to the core network device.

In this application, the paging failure indication message may be a user context release request message, for example, a UE Context Release Request.

Figure 7:
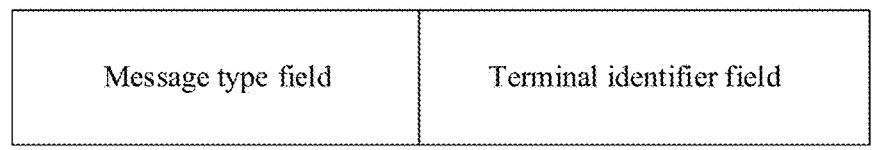
FIG. 7 is a schematic diagram of a paging failure indication message according to this application.

In this application, as shown in FIG. 7, the paging failure indication message includes at least a message type field and a terminal identifier field. The message type field is used to indicate a type of the paging failure indication message, and the terminal device identifier field is used to indicate the identifier of the paged target terminal.

In this application, the first base station may specifically send the paging failure indication message through an NG port or an S1 port. The NG port may be specifically a communications port between a base station and a core network in the LTE system, and the S1 port may be specifically a communications port between a base station and a core network in the 5G system.

Step S58: The core network device triggers paging the target terminal.

Figure 8:
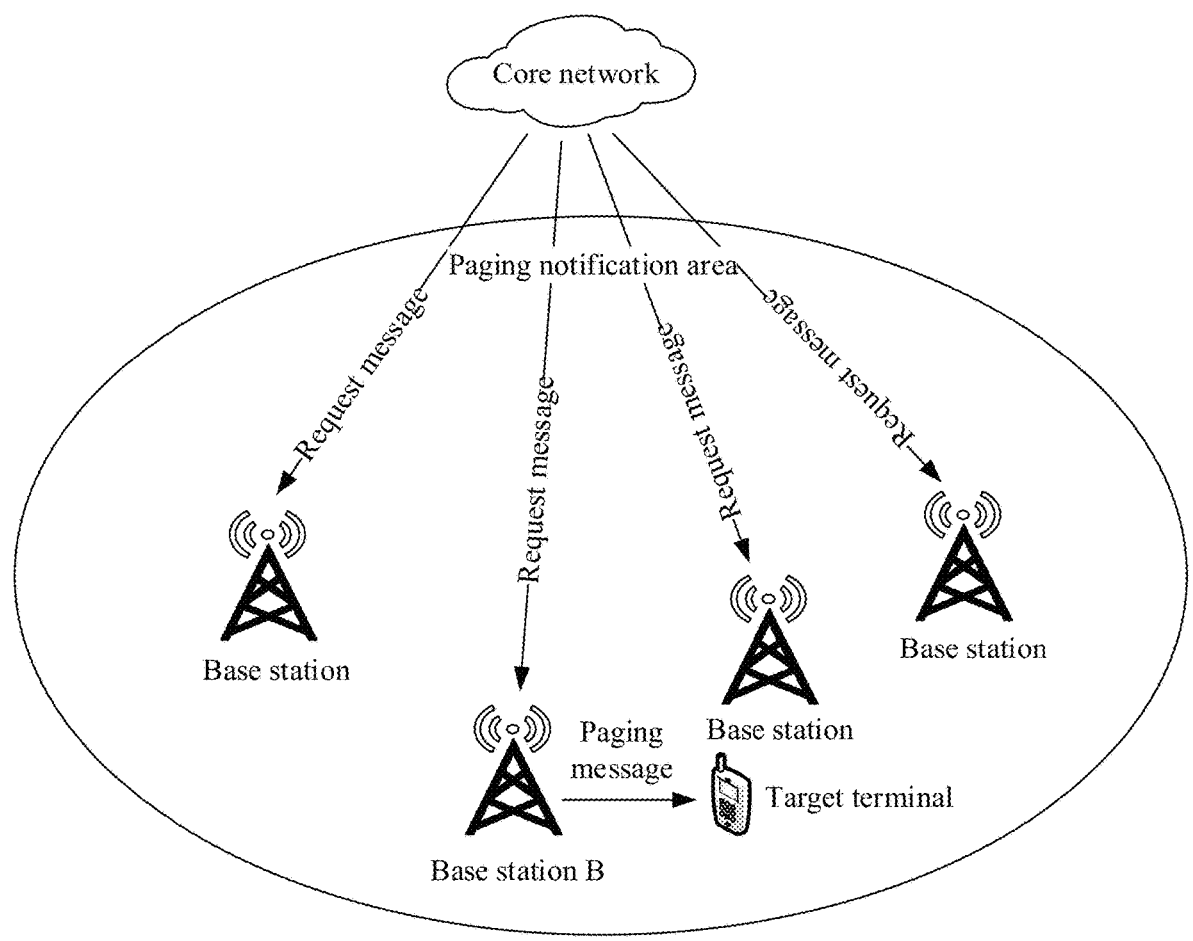
FIG. 8 shows a process in which a core network pages a target terminal according to this application.

In this application, as shown in FIG. 8, a process in which the core network triggers paging the target terminal is as follows: The core network sends a request message in a paging notification area of the target terminal, and after receiving the request message, base stations located in the paging notification area send paging messages to page the target terminal. After a base station successfully pages the target terminal (still referring to FIG. 8, for example, a base station B successfully pages the target terminal), the base station B sends a UE initialization message to a core network, and when receiving the UE initialization message, the core network establishes an S1AP connection to the base station B. The UE initialization message is a first message sent by the base station B to the core network after the target terminal successfully accesses the base station B randomly.

In this application, for a core network side device, if the UE initialization message has not been received within preset duration after the request message is sent, it may be determined that a current process of paging the target terminal fails, and paging to the target terminal is triggered again. In addition, if paging to the target terminal continuously fails, and after a quantity of paging times exceeds a specified number, the core network gives up paging the target terminal.

It can be learned from the foregoing that, in this application, the first base station may send the first request to request the one or more second base stations located in the paging notification area of the target terminal to page the target terminal. The second base station sends the second request to the first base station after successfully paging the target terminal. If the first base station receives the second request message from the second base station within the preset duration, the first base station sends the context of the target terminal to the second base station. In this case, the second base station may set up the RRC connection to the target terminal, and the second terminal is successfully paged. For a terminal device in a third mode, an RRC connection between the terminal device and a base station does not exist. Therefore, according to the method in this application, after receiving data sent by the core network to the terminal device, the first base station may page the terminal device.

It should be noted that, according to the method in this application, the first base station may determine whether the target terminal is successfully paged. For example, if the second request message is received within the preset duration, it may be determined that the target terminal is successfully paged. If the second request message is not received within the preset duration, it is determined that the target terminal fails to be paged. Therefore, a long time for waiting the second request message after the first base station sends the first request message may be avoided and a communication delay is reduced by using the method in this application.

It should be further noted that flexible switching from a base station triggered paging mechanism to a core network triggered paging mechanism is implemented by using the method in this application. Because a paging notification area triggered by the base station is smaller than a paging notification area triggered by the core network, overheads of the base station triggered paging mechanism are less than overheads of the core network triggered paging mechanism. In this application, the target terminal is first paged by using the base station triggered mechanism with lower overheads. After the base station triggered paging mechanism fails, the core network triggered mechanism is then used. On the basis of ensuring a paging success rate, paging overheads may be reduced by using the method in this application.

Figure 9:
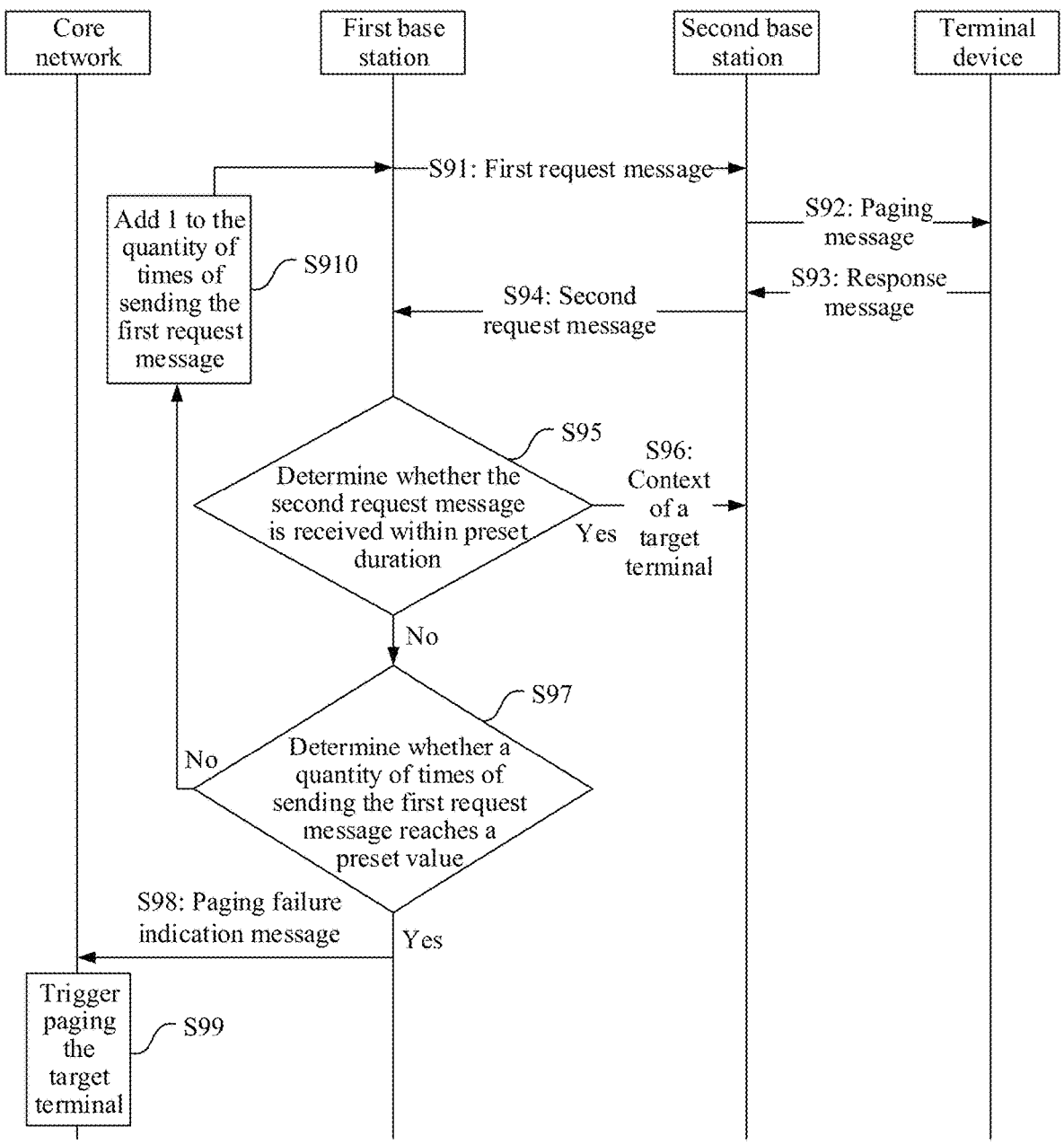
FIG. 9 is another schematic diagram of a communication method according to this application.

FIG. 9 shows a process of another paging method according to this application. A first base station in the process may correspond to the anchor base station in FIG. 2, FIG. 3, and FIG. 4, a second base station may correspond to the base station located in the paging notification area of the target terminal in FIG. 3, and a terminal device may correspond to the target terminal in FIG. 2, FIG. 3, and FIG. 4. As shown in FIG. 9, the paging method includes the following operations.

In operation S91, the first base station sends a first request message, where the first request message is used to request one or more second base stations located in a paging notification area of a target terminal to page the target terminal.

In this application, for content of the first request message, refer to FIG. 6 and records corresponding to FIG. 6, and details are not described herein again.

In operation S92, the second base station sends a paging message, where the paging message is used to page the target terminal.

In operation S93, the terminal device sends a response message to one of the one or more second base stations.

For the response message, refer to the foregoing records, and details are not described herein again.

In operation S94, the second base station sends a second request message to the first base station, where the second request message is used to obtain a context of the terminal device.

In operation S95, the first base station determines whether the first base station receives, within preset duration, the second request message, and if the first base station receives the second request message, performs step S96; otherwise, performs step S97.

In operation S96, the first base station sends a context of the target terminal to the second base station.

In this application, after the second base station obtains the context of the target terminal, the second base station may set up an RRC connection to the target terminal.

In operation S97, the first base station determines whether a quantity of times of sending the first request message reaches a preset value; and if the quantity of times of sending the first request message reaches the preset value, performs operation S98; otherwise, performs operation S910.

In operation S98, the first base station sends a paging failure indication message to a core network device.

In this application, for details of the paging failure indication message, refer to FIG. 7 and the foregoing literary records, and details are not described herein again.

In operation S99, the core network device triggers paging the target terminal.

In operation S910, the first base station adds 1 to the quantity of times of sending the first request message, and returns to step S91 to continue the paging process.

In this application, for the first base station, a core network is triggered to page the target terminal only when a quantity of times of paging the target terminal reaches a preset upper limit value. Because overheads of paging triggered by a base station is less than overheads of paging triggered by the core network, overheads of paging the target terminal may be further reduced in the manner in this application.

Figure 10:
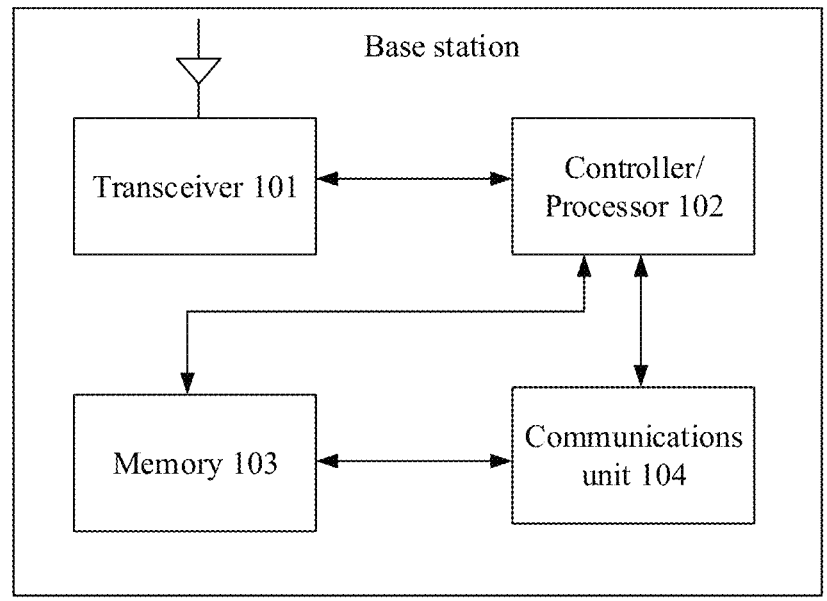
FIG. 10 is a schematic structural diagram of a base station according to this application.

FIG. 10 is a schematic structural diagram of a base station in the foregoing embodiments of this application. The base station may be the anchor base station in FIG. 2, FIG. 3, and FIG. 4, or the first base station or the second base station in FIG. 5 or FIG. 9.

In this application, the base station includes a transceiver 101 and a controller/processor 102. The transceiver 101 may be configured to support information transmission between the base station and the terminal device in the foregoing embodiments, and support wireless communication between the base station and a core network device.

The controller/processor 102 is configured to perform various functions used for communicating with the terminal device and the core network device. In an uplink, an uplink signal from the terminal device is received by using an antenna, is demodulated by the transceiver 101, and is further processed by the controller/processor 102 to restore service data and signaling information that are sent by the terminal device. In a downlink, service data and a signaling message are processed by the controller/processor 102 and demodulated by the transceiver 101 to generate a downlink signal, and the downlink signal is transmitted to UE by using the antenna. The controller/processor 102 is further configured to perform the paging method described in the foregoing embodiment, to determine a first request message and a context of a target terminal, or to determine a paging message and a second request message. The controller/processor 102 is further configured to perform a processing process that relates to the base station in FIG. 5 or FIG. 9 and/or another process of technologies described in this application. The base station may further include a memory 103 that may be configured to store program code and data of the base station. The base station may further include a communications unit 104, configured to support the base station in communicating with another network entity, for example, to support the base station in communicating with the core network device shown in FIG. 5 or FIG. 9.

It may be understood that FIG. 10 shows only a simplified design of the base station. During actual application, the base station may include any quantity of transmitters, receivers, processors, controllers, memories, communications units, and the like, and all base stations that can implement this application fall within the protection scope of this application.

Figure 11:
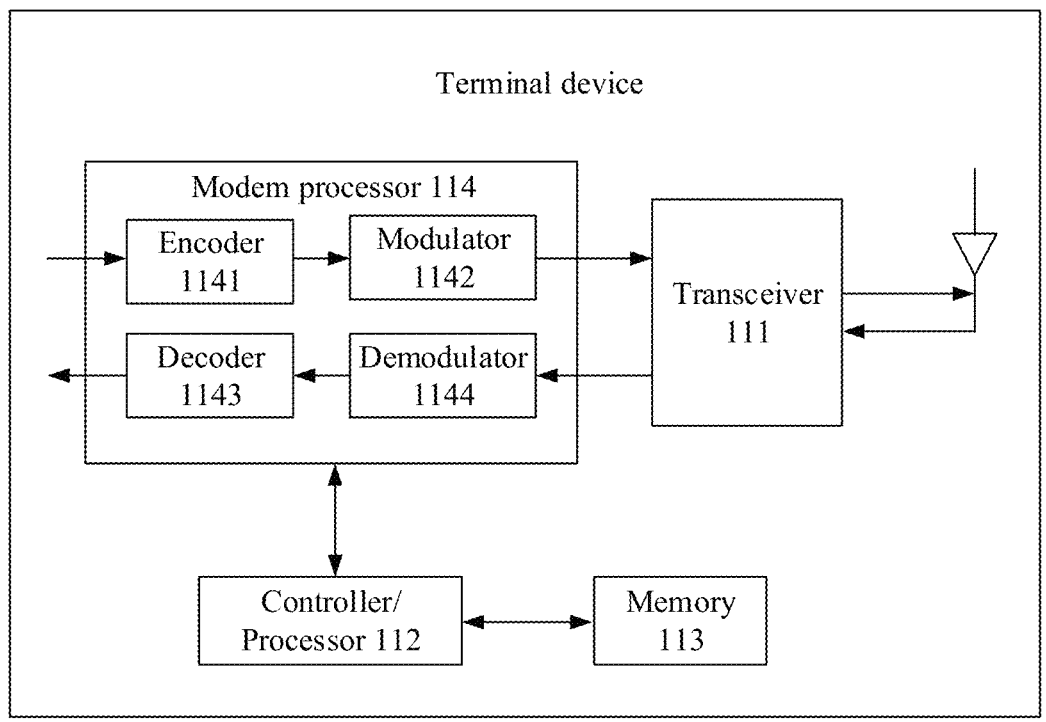
FIG. 11 is a schematic structural diagram of a terminal device according to this application.

FIG. 11 is a simplified schematic diagram of a design structure of a terminal device in an embodiment of this application. The terminal device may be one of the terminal devices in FIG. 1 to FIG. 9. The terminal device includes a transceiver 111 and a controller/processor 112, and may further include a memory 113 and a modem processor 114.

The transceiver 111 adjusts (for example, analog-converts, filters, amplifies, and up-converts) the output sample and generates an uplink signal. The uplink signal is transmitted to the base station in the foregoing embodiments by using an antenna. In a downlink, the antenna receives a downlink signal transmitted by the base station in the foregoing embodiment. The transceiver 111 adjusts (for example, filters, amplifies, down-converts, and digitizes) a signal received from the antenna, and provides an input sample. In the modem processor 114, an encoder 1141 receives service data and a signaling message that are to be sent in an uplink, and processes (for example, formats, encodes, and interleaves) the service data and the signaling message. A modulator 1142 performs further processing (for example, symbol mapping and modulation) on encoded service data and an encoded signaling message, and provides an output sample. A decoder 1143 processes (for example, de-interleaves and decodes) the symbol estimation and provides decoded data and a decoded signaling message that are to be sent to the terminal device. A demodulator 1144 processes (for example, demodulates) the input sample, and provides symbol estimation. The encoder 1141, the modulator 1142, the decoder 1143, and the demodulator 1144 may be implemented by the combined modem processor 114. These units perform processing based on a wireless technology (for example, an access technology in LTE or another evolved system) used in a radio access network.

The controller/processor 112 controls and manages an action of the terminal device and is configured to perform processing implemented by the terminal device in the foregoing embodiments. The terminal device may determine whether a paging message includes an identifier of the terminal device, and if the paging message includes the identifier of the terminal device, the terminal device sends an RRC acknowledgment message to a second base station. In an example, the controller/processor 112 may be configured to support the terminal device in performing the content related to the terminal device in FIG. 5 or FIG. 9. The memory 113 is configured to store program code and data used by the terminal device.

Figure 12:
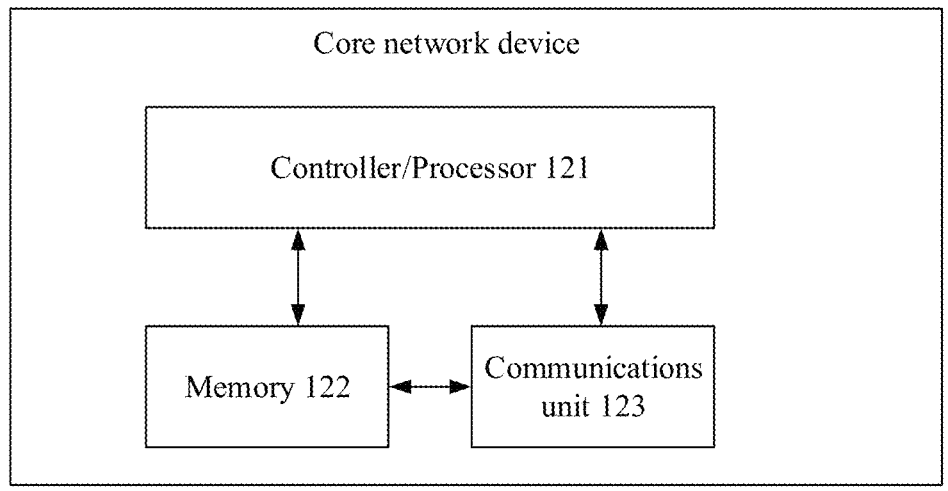
FIG. 12 is a schematic structural diagram of a core network device according to this application.

FIG. 12 is a schematic diagram of a core network device in the foregoing embodiments. The core network device may be the core network device in FIG. 1 to FIG. 9. The core network device may include a controller/processor 121, a memory 122, and a communications unit 123. The controller/processor 121 is configured to page a terminal device. The memory 122 may be configured to store program code and data of the core network device. The communications unit 123 is configured to support communication between the core network device and a first base station, for example, receive a paging failure indication message sent by the first base station.

Figure 13:
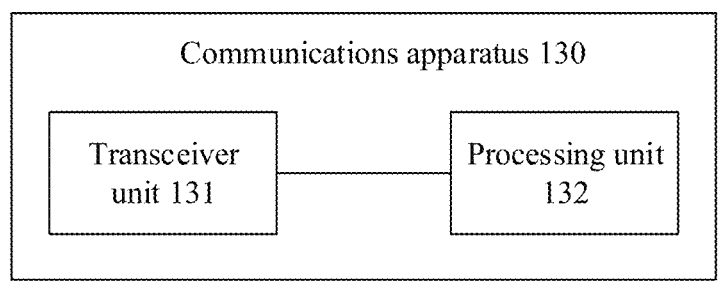
FIG. 13 to FIG. 16 are schematic structural diagrams of a communications apparatus according to this application.

This application further provides a communications apparatus. The communications apparatus may be the first base station in FIG. 5 or FIG. 9. As shown in FIG. 13, the communications apparatus 130 includes:

a transceiver unit 131, configured to: send a first request message, and if receiving, within preset duration, a second request message that is sent by one of the one or more second base stations, send a context of the target terminal to the second base station that sends the second request message, where the first request message is used to request the one or more second base stations located in a paging notification area of the target terminal to page the target terminal, and the second request message is used to obtain the context of the target terminal; and a processing unit 132, configured to determine the first request message and the context of the target terminal.

In this application, the preset duration is preset duration timed by a timer. The processing unit is further configured to start the timer when the transceiver sends the first request message. When receiving, within the preset duration, the second request message that is sent by one of the one or more second base stations, the transceiver unit is specifically configured to receive, within the preset duration timed by the timer, the second request message that is sent by one of the one or more second base stations.

In this application, the processing unit is further configured to: when the transceiver does not receive, within the preset duration, the second request message that is sent by one of the one or more second base stations, determine whether a quantity of times of sending the first request message by the first base station reaches a preset value; and the transceiver unit is further configured to send a paging failure indication message to a core network device if the quantity of times of sending the first request message reaches the preset value.

In this application, the processing unit is further configured to add 1 to the quantity of times of sending the first request message if the quantity of times of sending the first request message does not reach the preset value.

In this application, the transceiver unit is further configured to send a paging failure indication message to a core network device if not receiving, within the preset duration, the second request message that is sent by one of the one or more second base stations.

In this application, the transceiver unit sends the first request message through an Xn or X2 port, and the transceiver unit receives the second request message through the Xn or X2 port.

In this application, the transceiver unit sends the paging failure indication message through an NG port or an S1 port.

In this application, the paging failure indication message includes a message type field and a terminal identifier field. The message type field is used to indicate a type of the paging failure indication message, and the terminal identifier field is used to indicate an identifier of the paged target terminal.

In this application, the first request message includes at least the terminal identifier field and a paging range area field. The paging range area field is used to indicate a range area of the second base station that pages the target terminal, and the terminal identifier field is used to indicate the identifier of the paged target terminal.

In this application, the first request message includes at least one of an international mobile subscriber identity IMSI field and a discontinuous reception DRX cycle field. The IMSI field is used to indicate at least one bit of an IMSI of the paged target terminal, the DRX cycle field is used to indicate a DRX cycle of the target terminal, and the DRX cycle field and the IMSI field are used by the second base station to determine a time for paging the target terminal. The time for paging the target terminal is a time for sending a paging message that includes the identifier of the target terminal.

For the description and specific beneficial effects of the paging method performed by the communications apparatus, refer to the description of the first base station in FIG. 5 or FIG. 9 and related literary records in the foregoing embodiments. Details are not described herein again.

Figure 14:
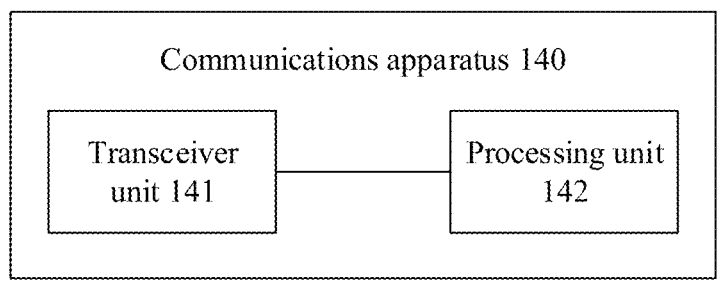

This application further provides another communications apparatus. As shown in FIG. 14, the communications apparatus 140 may correspond to the second base station in FIG. 5 or FIG. 9, and includes:

a transceiver unit 141, configured to: receive a first request message sent by a first base station, send a paging message, send a second request message to the first base station when receiving a response message sent by the target terminal, and receive a context of the target terminal sent by the first base station, where the paging message is used to page the target terminal, and the second request message is used to obtain the context of the target terminal; and a processing unit 142, configured to determine the paging message and the second request message.

In this application, the response message is an RRC connection setup acknowledgment message or an RRC connection resume acknowledgment message.

In this application, the transceiver unit receives the first request message through an Xn or X2 port, and the transceiver unit sends the second request message through the Xn or X2 port.

In this application, the first request message includes at least a terminal identifier field and a paging range area field. The paging range area field is used to indicate a range area of a second base station that pages the target terminal, and the terminal identifier field is used to indicate an identifier of the paged target terminal.

In this application, the first request message includes at least one of an international mobile subscriber identity IMSI field and a discontinuous reception DRX cycle field. The IMSI field is used to indicate at least one bit of an IMSI of the paged target terminal, the DRX cycle field is used to indicate a DRX cycle of the target terminal, and the DRX cycle field and the IMSI field are used by the second base station to determine a time for paging the target terminal. The time for paging the target terminal is a time for sending a paging message that includes the identifier of the target terminal.

In this application, the processing unit is further configured to calculate a wake-up time of the target terminal based on the IMSI field and the DRX cycle field that are in the first request message; and when sending the paging message, the transceiver unit is specifically configured to send the paging message at the wake-up time of the target terminal.

In this application, the paging message includes a first identifier of the paged target terminal or a second identifier of the paged target terminal, the first identifier is a temporary mobile subscriber identity S-TMSI or the international mobile subscriber identity IMSI of the paged target terminal, and the second identifier is another identifier, other than the S-TMSI or the IMSI, of the paged target terminal.

For the description and specific beneficial effects of the paging method performed by the communications apparatus, refer to the description of the second base station in FIG. 5 or FIG. 9 and related literary records in the foregoing embodiments. Details are not described herein again.

Figure 15:
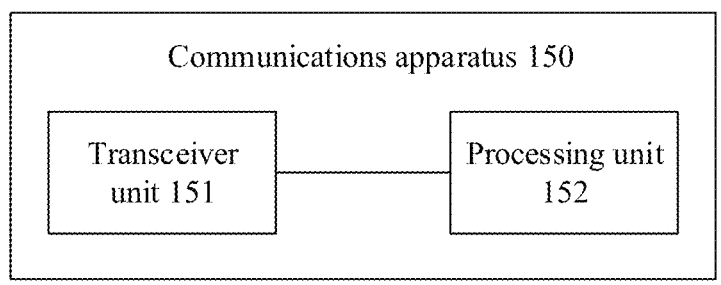

This application provides another communications apparatus. As shown in FIG. 15, the communications apparatus 150 may correspond to the core network device in FIG. 5 or FIG. 9, and includes:

a transceiver unit 151, configured to receive a paging failure indication message sent by a first base station, where the paging failure indication message is used to indicate that a process in which the first base station pages a target terminal fails; and a processing unit 152, configured to trigger paging the target terminal based on the paging failure indication message.

In this application, the paging failure indication message is used to include a message type field and a terminal identifier field. The message type field is used to indicate a type of the paging failure indication message, and the terminal identifier field is used to indicate an identifier of the paged target terminal.

In this application, the transceiver unit receives the paging failure indication message through an NG port or an S1 port.

For the description and specific beneficial effects of the paging method performed by the communications apparatus, refer to the description of the core network device in FIG. 5 or FIG. 9 and related literary records in the foregoing embodiments. Details are not described herein again.

Figure 16:
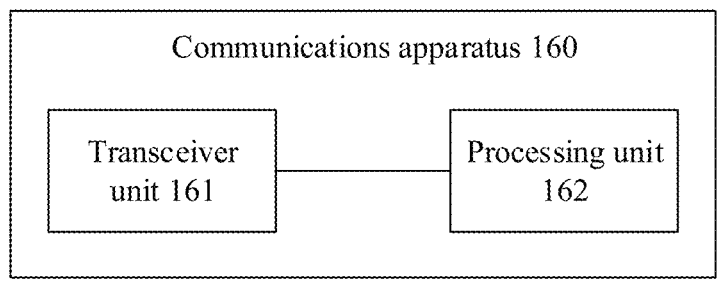

This application provides another communications apparatus. As shown in FIG. 16, the communications apparatus 160 may correspond to the terminal device in FIG. 5 or FIG. 9, and includes:

a transceiver unit 161, configured to: receive a paging message sent by one or more second base stations, and send a response message to one of the one or more second base stations, where the paging message is sent by the one or more second base stations when the one or more second base stations receive a first request message sent by a first base station, the first request message is used to request the one or more second base stations located in a paging notification area of the terminal device to page the target terminal, and the response message is used by the terminal device to set up an RRC connection to the second base station; and a processing unit 162, configured to determine the response message.

In this application, the transceiver unit is further configured to receive paging messages sent by a plurality of second base stations; the processing unit is further configured to: select, from the plurality of second base stations, a second base station whose cell quality meets a requirement; and when sending the response message to one of the one or more second base stations, the transceiver unit is specifically configured to send the response message to the second base station whose cell quality meets the requirement, where the response message is used by the terminal device to set up an RRC connection to the second base station whose cell quality meets the requirement.

In this application, when sending the response message to the second base station whose cell quality meets the requirement, the transceiver unit is specifically configured to: when determining that the paging message includes a first identifier of the terminal device, send an RRC connection setup acknowledgment message to the second base station whose cell quality meets a condition.

In this application, when sending the response message to the second base station whose cell quality meets the requirement, the transceiver unit is specifically configured to: when determining that the paging message includes a second identifier of the terminal device, send an RRC connection resume acknowledgment message to the second base station whose cell quality meets the requirement.

In this application, the transceiver unit is further configured to receive a paging message sent by a second base station; and when sending the response message to one of the one or more second base stations, the transceiver unit is specifically configured to send a response message to the second base station, and the response message is used by the terminal device to set up an RRC connection to the second base station.

In this application, when sending the response message to the second base station, the transceiver unit is specifically configured to send an RRC connection setup acknowledgment message to the second base station when determining that the paging message sent by the second base station includes a first identifier of the terminal device.

In this application, when sending the response message to the second base station, the transceiver unit is specifically configured to send an RRC connection resume acknowledgment message to the second base station when determining that the paging message sent by the second base station includes a second identifier of the terminal device.

In this application, the first identifier is a temporary mobile subscriber identity S-TMSI or an international mobile subscriber identity IMSI of the terminal device.

In this application, the second identifier is another identifier, other than a temporary mobile subscriber identity S-TMSI and an international mobile subscriber identity IMSI, of the terminal device.

In this application, the first request message includes at least a terminal identifier field and a paging range area field. The paging range area field is used to indicate a range area of the second base station that pages the target terminal, and the terminal identifier field is used to indicate an identifier of the paged target terminal.

In this application, the first request message includes at least one of an international mobile subscriber identity IMSI field and a discontinuous reception DRX cycle field. The IMSI field is used to indicate at least one bit of an IMSI of the paged target terminal, the DRX cycle field is used to indicate a DRX cycle of the target terminal, and the DRX cycle field and the IMSI field are used by the second base station to determine a time for paging the target terminal. The time for paging the target terminal is a time for sending a paging message that includes the identifier of the target terminal.

For the description and specific beneficial effects of the paging method performed by the communications apparatus, refer to the description of the terminal device in FIG. 5 or FIG. 9 and related literary records in the foregoing embodiments. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto the computer or another programmable data processing device, so that a series of operations and steps are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
   sending, by a first base station, a first request message that requests one or more second base stations located in a paging notification area of a target terminal to page the target terminal;
   determining, by the first base station, that the first base station does not receive, within a preset duration, a second request message that is sent by a second base station of the one or more second base stations and that is to obtain a context of the target terminal;
   determining, by the first base station, whether a quantity of times of sending the first request message by the first base station reaches a preset value; and
   sending, by the first base station, a paging failure indication message to a core network device in response to determining that the quantity of times of sending the first request message by the first base station reaches the preset value.

2. The communication method according to claim 1, wherein the preset duration is timed by a timer, and the sending, by the first base station, the first request message comprises:
   starting, by the first base station, the timer;
   sending, by the first base station, the first request message; and
   wherein the receiving of the second request message that is sent by one of the one or more second base stations comprises:
   receiving, by the first base station within the preset duration timed by the timer, the second request message that is sent by one of the one or more second base stations.

3. The communication method according to claim 1, wherein the method further comprises:
   when the quantity of times of sending the first request message by the first base station does not reach the preset value, adding 1 to the quantity of times of sending the first request message, and sending the first request message; and
   when the second request message sent by the second base station of the one or more second base stations is received within the preset duration, sending a context of the target terminal to the second base station that sends the second request message; or when the second request message that is sent by one of the one or more second base stations is not received within the preset duration, determining whether the quantity of times of sending the first request message by the first base station reaches the preset value again.

4. The communication method according to claim 1, wherein the method further comprises:
sending the paging failure indication message to the core network device when the first base station does not receive, within the preset duration, the second request message that is sent by one of the one or more second base stations.

5. The communication method according to claim 1, wherein the first base station sends the first request message through an Xn or X2 port, and the first base station receives the second request message through the Xn or X2 port.

6. The communication method according to claim 1, wherein the first base station sends the paging failure indication message through an NG port or an S1 port.

7. The communication method according to claim 6, wherein the paging failure indication message comprises a message type field and a terminal identifier field, the message type field indicates a type of the paging failure indication message, and the terminal identifier field indicates an identifier of the target terminal.

8. The communication method according to claim 1, wherein the first request message comprises at least a terminal identifier field and a paging range area field, the paging range area field indicates a range area of the second base station that pages the target terminal, and the terminal identifier field indicates an identifier of the target terminal.

9. The communication method according to claim 1, wherein the first request message comprises an international mobile subscriber identity (IMSI) field that indicates at least one bit of an IMSI of the target terminal.

10. The communication method according to claim 1, wherein the first request message comprises a discontinuous reception DRX cycle field, which indicates a DRX cycle of the target terminal.

11. A communication apparatus, comprising: a processor; a memory coupled to the processor and storing program instructions, which, when executed by the processor, perform operations comprising:
sending a first request message that requests one or more base stations located in a paging notification area of a target terminal to page the target terminal; determining that the communication apparatus does not receive, within a preset duration, a second request message that is sent by a base station of the one or more base stations and that is to obtain a context of the target terminal;
determining whether a quantity of times of sending the first request message by the communication apparatus reaches a preset value; and
sending a paging failure indication message to a core network device in response to determining that the quantity of times of sending the first request message by the communication apparatus reaches the preset value.

12. The communication apparatus according to claim 11, wherein the preset duration is timed by a timer, and the sending, by the communication apparatus, the first request message comprises:
starting the timer;
sending the first request message; and
wherein the receiving of the second request message that is sent by one of the one or more base stations comprises:
receiving, within the preset duration timed by the timer, the second request message that is sent by one of the one or more base stations.

13. The communication apparatus according to claim 11, when the quantity of times of sending the first request message by the communication apparatus does not reach the preset value, adding 1 to the quantity of times of sending the first request message, and sending the first request message; and
when the second request message sent by the base station of the one or more base stations is received within the preset duration, sending a context of the target terminal to the base station that sends the second request message; or
when the second request message that is sent by one of the one or more base stations is not received within the preset duration, determining whether the quantity of times of sending the first request message reaches the preset value again.

14. The communication apparatus according to claim 11, the operations further comprising:
sending the paging failure indication message to the core network device when the communication apparatus does not receive, within the preset duration, the second request message that is sent by one of the one or more base stations.

15. The communication apparatus according to claim 11, wherein the communication apparatus sends the first request message through an Xn or X2 port, and the communication apparatus receives the second request message through the Xn or X2 port.

16. The communication apparatus according to claim 11, wherein the communication apparatus sends the paging failure indication message through an NG port or an S1 port.

17. The communication apparatus according to claim 16, wherein the paging failure indication message comprises a message type field and a terminal identifier field, the message type field indicates a type of the paging failure indication message, and the terminal identifier field indicates an identifier of the target terminal.

18. The communication apparatus according to claim 11, wherein the first request message comprises at least a terminal identifier field and a paging range area field, the paging range area field indicates a range area of the base station that pages the target terminal, and the terminal identifier field indicates an identifier of the target terminal.

19. The communication apparatus according to claim 11, wherein the first request message comprises an international mobile subscriber identity (IMSI) field that indicates at least one bit of an IMSI of the target terminal.

20. The communication apparatus according to claim 11, wherein the first request message comprises a discontinuous reception DRX cycle field, which indicates a DRX cycle of the target terminal.

* * * * *